United States Patent [19]

Maheshwary et al.

[11] 4,340,321
[45] Jul. 20, 1982

[54] OIL BOOM FOR OPEN SEA SKIMMER BARGE

[75] Inventors: Ashok K. Maheshwary, Houston, Tex.; William M. Ayers, Duncan, Okla.

[73] Assignee: Halliburton Company, Duncan, Okla.

[21] Appl. No.: 161,236

[22] Filed: Jun. 19, 1980

[51] Int. Cl.³ .............................................. E02B 15/04
[52] U.S. Cl. .................................... 405/66; 210/923; 405/63
[58] Field of Search ................................ 405/63–77; 210/922, 923

[56] References Cited

U.S. PATENT DOCUMENTS

| | | |
|---|---|---|
| 3,142,281 | 7/1964 | Muller ............................ 210/923 X |
| 3,314,540 | 4/1967 | Lane . |
| 3,314,545 | 4/1967 | Grabbe et al. . |
| 3,465,882 | 9/1969 | Bowerbox . |
| 3,532,219 | 10/1970 | Valdespino . |
| 3,563,036 | 2/1971 | Smith et al. . |
| 3,612,280 | 10/1971 | Fitzgerald . |
| 3,615,017 | 10/1971 | Valdespino . |
| 3,653,510 | 4/1972 | Fitzgerald . |
| 3,664,504 | 5/1972 | Ayers et al. . |
| 3,679,058 | 7/1972 | Smith . |
| 3,690,464 | 9/1972 | Helnicke . |
| 3,700,107 | 10/1972 | Flaviani . |
| 3,710,943 | 1/1973 | Davidson et al. . |
| 3,715,034 | 2/1973 | Ivanoff . |
| 3,802,201 | 4/1974 | Hoult et al. ....................... 405/68 |
| 3,804,251 | 4/1974 | Farrell et al. . |
| 3,807,178 | 4/1974 | Tanksley ........................... 405/67 |
| 3,812,968 | 5/1974 | Aramaki et al. . |
| 3,823,828 | 7/1974 | Derzhavets et al. . |
| 3,859,797 | 1/1975 | Ayers ................................ 405/67 |
| 3,860,519 | 1/1975 | Weatherford . |
| 3,875,062 | 1/1975 | Rafael . |
| 3,922,860 | 12/1975 | Tanksley ........................... 405/66 |
| 3,957,646 | 5/1976 | Wickert . |
| 3,966,615 | 6/1976 | Petchul et al. . |
| 3,983,034 | 9/1976 | Wilson . |
| 4,076,624 | 2/1978 | Tolan . |
| 4,089,178 | 5/1978 | Kinase et al. . |
| 4,116,833 | 9/1978 | Stagemeyer et al. . |
| 4,123,911 | 11/1978 | Finigan et al. . |
| 4,133,765 | 1/1979 | Stupica . |

FOREIGN PATENT DOCUMENTS

2005554  4/1979  United Kingdom .

Primary Examiner—Dennis L. Taylor
Attorney, Agent, or Firm—John H. Tregoning; James R. Duzan

[57] ABSTRACT

Oil boom for an open sea skimmer barge comprising a hull having a bow, bottom, side walls, stern having a substantially elongate slot extending across a portion thereof and a deck, a spill suction tunnel, a collection tank, secondary oil separation means and tertiary oil separation means.

17 Claims, 13 Drawing Figures

OIL BOOM FOR OPEN SEA SKIMMER BARGE

BACKGROUND OF THE INVENTION

This invention is directed to an oil boom and method of deploying and retrieving the same for an open sea skimmer barge for the removal of crude oil, refined hydrocarbon product or other floating pollutant slicks for water surfaces, particularly those slicks caused by accidents while handling, transporting, processing, controlling, producing or exploring for hydrocarbons.

For many years, crude oil and refined hydrocarbon product spillages at sea have been a problem. The environment damage and cleanup costs of large spills can reach millions of dollars, which along with damaging publicity present a serious problem for the industries involved. As more crude oil and refined hydrocarbon products are being transported over longer distances by larger tankers, and with the increases in offshore hydrocarbon exploration and production, the problem of dealing with spillages is likely to increase.

Since crude oil and refined hydrocarbon product spillages are likely to continue at an ever increasing rate, a method and apparatus are needed for reliably removing the spillages as rapidly as possible from the surface of the water in open seas or large bays, lakes and rivers.

Slicks in the open sea vary considerably in their characteristics depending upon the type of crude oil or refined hydrocarbon product spilled, the weather, size of the spillage and the condition of the sea. The slick thickness may vary on the surface of the sea and be considered as having a portion extending below the surface of the sea due to the continual degradation of the slick by the elements and natural evaporation of the hydrocarbons.

When compared with the problems of recovering spillages in quiet, calm seas, bays, harbors or rivers, the recovery of spillages in the open sea, particularly under adverse weather conditions, is clearly more difficult. Open sea spillage recovery requires equipment which must be self-contained, capable of maintaining its station over long periods of time and capable of operating in adverse weather conditions, such as in seas of eight feet or more. Frequently in the past, many types of spillage recovery equipment have only been effective in relatively calm conditions and were intended for short term operation.

To date, many types of methods and apparatus have been used in attempts to deal with spillages.

Detergents and other chemical treatments of slicks have been and continue to be utilized, but each has limitations and inherent hazards which can be as undesirable as the slicks themselves.

In the past to confine spillages in specific areas, floating containment booms were often deployed. The floating booms were either an inflatable type or had buoyant materials secured thereto and had permeable or impermeable barriers extending below the surface of the water.

Other types of floating containment booms often employ storage or deployment devices for the handling and storage thereof. Such typical types of containment booms are shown in U.S. Pat. Nos. 3,532,219; 3,563,036; 3,664,504; 3,679,058; 3,922,860; 4,076,624; 4,089,178; and 4,123,911.

Yet other types of floating containment booms are utilized to collect and direct spillages on the surface of the water to a skimming device being towed by the vessel for the removal of the spillage. Such typical types of containment booms and skimming devices are shown in U.S. Pat. Nos. 3,612,280; 3,653,510; 3,710,943; 3,983,034; 4,116,833 and 4,133,765.

Another type of prior spillage removal equipment employing endless belt transports, such as those described in U.S. Pat. Nos. 3,314,540 and 3,314,545, are considered by their design to have a limited capacity to collect floatage of both solid and liquid forms of the spillage. More particularly, some prior constructions depend on the adherence of floatage to the belt transport to recover solid and liquid floating material of the spillage. Others provide structures that push the spillage to recover the same, and still others require pumps to enhance the collection of floatage, such as the belt transport sold by Marco Pollution Control, Seattle, Wash. Yet others tend at least to partially bulldoze the spillage being recovered, which increases the likelihood that some spillage will be pushed to the side and hence not collected.

Another prior skimming type spillage recovery equipment utilizes a submerged forward lip or edge and processes all the inflow, whether floatage to be removed or the liquid spillage being skimmed, which is above the shelf edge. This type of recovery equipment generally takes in the floatage and liquid spillage which is above the shelf edge, and hence leaves floatage and liquid spillage uncollected where there is a considerable depth thereof. This type of arrangement is illustrated in U.S. Pat. Nos. 3,690,464; 3,875,062 and 3,823,828. This skimming equipment illustrated utilizes the forward velocity of the vessel and the pumping or suction action of either the vessel's propulsion means or a separate pumping means to help enhance the flow of spillage over the submerged forward lip. Wave action will affect this type of skimming equipment since heavy seas will cause the excessive inflow of water with the spillage since the control of the depth of the forward lip below the surface of the water is difficult. With the excessive inflow of water with the spillage, it will also become more difficult to subsequently separate the spillage therefrom, thereby requiring other types of separation equipment or much larger on-board holding tanks for the excessive water and spillage.

Yet another prior skimming type spillage recovery equipment utilizes a downwardly inclined member having a horizontal slot or opening at the lower end thereof to force the slick downwardly during the passage of the inclined member thereover and into the slot or opening due to the pressure differential created by the buoyancy of the slick. The pressure differential may be increased to ensure the slick will flow into the slot or opening through the use of pumps to decrease the pressure within the cavity fed by the slot or opening. Typical examples of this type of equipment are described in U.S. Pat. Nos. 3,465,882; 3,615,017; 3,715,034; 3,860,519 and 3,966,615 and published U.K. Patent Application No. GB 2,005,554. In this type of skimming equipment the skimmer may be stationary having a flowing body of water moving thereby, as in U.S. Pat. No. 3,465,882, may be self-propelled through the water utilizing a reduced collection tank pressure, as in U.S. Pat. No. 3,615,017, may be self-propelled utilizing a variable flap to control the slot or opening width and merely utilize a gravity settling technique in the collection tank, as in U.S. Pat. No. 3,715,034, or may be self-propelled utilizing a reduced collection tank pressure and a wave-receiving splash plate on the bow thereof, as in published U.K. Patent Application No. GB 2,005,554. This type of spillage recovery equipment requires relatively high velocities downwardly along the inclined member of the spillage relative to the inclined member, i.e., for example, five to ten knots, for most efficient operation and also has a tendency to sidewardly deflect a portion of the spillage, even with the addition of vertical extensions along the inclined member to prevent the same. As with the submerged forward lip type skimming equipment, this type of equipment suffers performance degradation in heavy seas since it is difficult to control the height of the inclined member with respect to the wave height. Also, since in open sea skimming operations high forward velocities are required to maintain the high velocities of the spillage downwardly along the inclined member with respect to the inclined member, sideward deflection of the slick and splashing of the slick over the bow of the vessel and large bow waves created by pushing and churning of the spillage, even in calm seas let alone heavy seas, are a problem.

Still another type of spillage recovery equipment utilizes a rotating downwardly inclined endless belt to force the slick downwardly during the passage of the belt thereover and into a collection tank due to the pressure differential created by the buoyancy of the slick as it is depressed. Such equipment is illustrated in U.S. Pat. Nos. 3,314,540; 3,804,251; and 3,812,968. While not necessarily requiring high forward velocities for skimming operations, such velocities can be artificially created by increasing the rotational speed of the belts. For open sea skimming operations this type of equipment may require the use of many rotating endless belt assemblies, may have problems operating in heavy seas due to the inability to compensate for wave height variation thereby having waves break over the vessel on which the equipment is installed, and may sidewardly deflect portions of the slick during operations thereby lowering the effective skimming efficiency of the device.

Other types of recovery equipment utilize a combination of slick separation techniques in order to remove as much water from the spillage in order to reduce handling and storage problems on board the equipment. One such device having an initial submerged forward lip to skim the slick, a plurality of rotating drums to further separate the water from the slick and a gravity settling processing tank to further separate the water from the slick is illustrated in U.S. Pat. No. 3,700,107. Another such device having an initial suction type skimming device, a further gravity settling tank for a secondary water and slick separation means and finally a centrifugal type separating means is illustrated in U.S. Pat. No. 3,957,646.

SUMMARY OF THE INVENTION

The open sea skimming barge of the present invention is self-contained, capable of maintaining its station over extended periods of time, capable of operating in adverse weather conditions and utilizes a multiplicity of separation techniques to ensure the most efficient recovery of open sea spillages. The open sea skimming barge of the present invention utilizes a unique containment boom arrangement, spillage suction tunnel having an integral variable flap therein for initial separation of spillage into a collection tank, a secondary recovery means for further separation of the spillage in the collection tank and a tertiary recovery means for the final separation of the spillage for subsequent storage in holding tanks for offloading.

The present invention and the advantages thereof will be better understood when taken in conjunction with the following specification and drawings.

DESCRIPTION OF THE INVENTION

Figure 1:
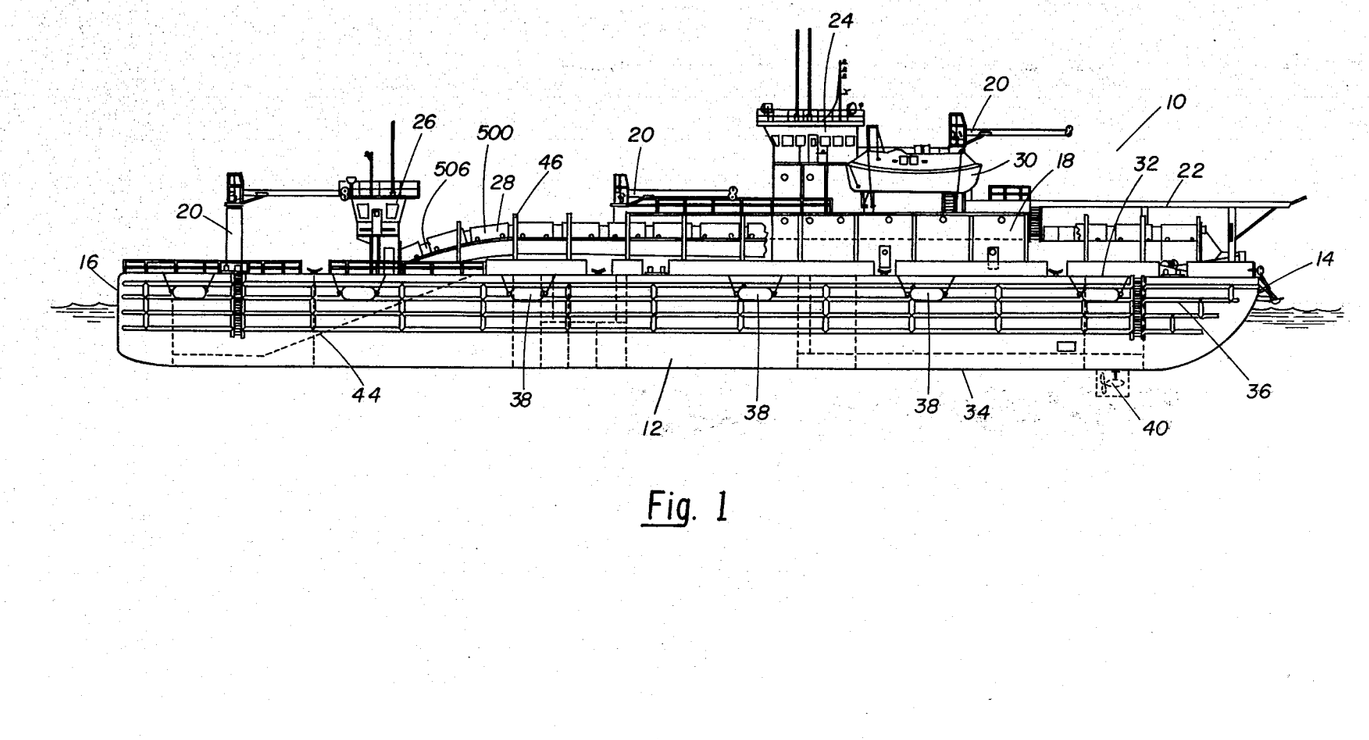
FIG. 1 is a side view of the open sea skimmer barge of the present invention.

Referring to FIG. 1, the open sea skimmer barge 10 of the present invention is shown in its preferred embodiment.

The open sea skimmer barge 10 comprises a hull 12 having a raked bow 14 and transom stern 16, deckhouse 18, cranes 20, helideck 22, control tower 24, skimmer control tower 26, oil booms 28 and life boats 30.

The main deck 32 of the hull 12 is constructed having no camber or shear and the bottom 34 of the hull 12 is constructed having no deadrise. The hull 12 is further constructed having a bilge radius, having rub rails 36, having a plurality of suitable fenders 38 thereabout, having retractable bow thrusters 40 on each side of the raked bow 14, having a transverse stern thruster 42 (see FIG. 8), having aft ramps 44 for the deployment and retrieval of the oil booms 28, having oil boom storage supports 46 on the port and starboard side thereof for the storage of the oil booms 28 when not in use, and a centerline entry slot 48 (see FIG. 8) at the transom stern 16 for the entry of the spillage into the hull 12.

The hull 12 further contains various compartments and equipment not shown in FIG. 1 which will be described hereafter.

Figure 2:
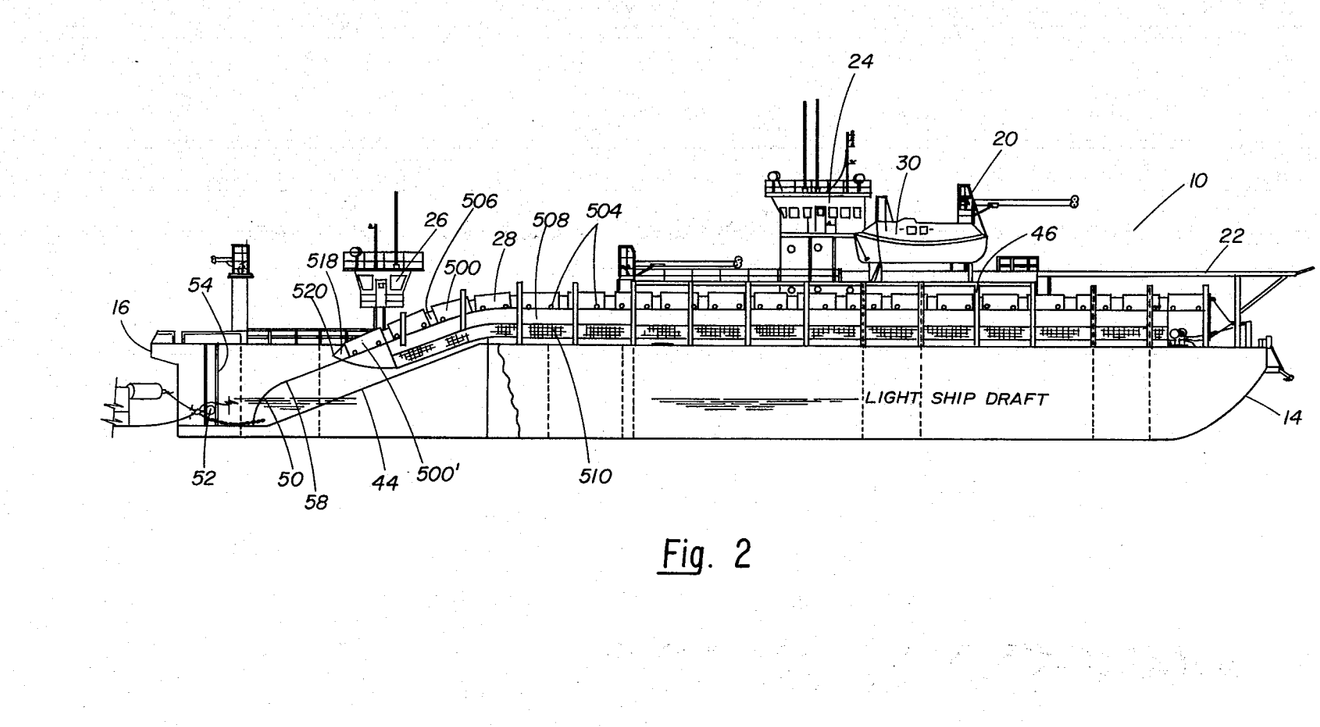
FIG. 2 is a partial cutaway side view of the open sea skimmer barge of the present invention.

Referring to FIG. 2, the open sea skimmer barge 10 is shown in a partial cutaway view showing one of the aft ramps 44 for the deployment and retrieval of the oil booms 28. The aft ramps 44 extend along a portion of aft portion of the hull 12 on either side thereof. The aft ramps 44 provide a surface along which the oil booms 28 may be transported from their storage position on oil boom storage rails 46 when the booms 28 are being deployed and retrieved.

The aft ramps 44 terminate along the aft portion of the hull 12 having the ends 50 of the ramps 44 being arcuately shaped for the guidance of the booms 28 with respect to the hull 12 when the open sea skimmer barge 10 is not loaded and at an even keel.

When the booms 28 are deployed, to control the relationship of the boom height with respect to the stern 16 to compensate for draft changes of the barge 10, the lines securing the boom 28 to the barge 10 are positioned about a guide roller 52 which is movably retained in track 54. The guide roller 52 may be vertically adjusted with respect to the hull 12 by any suitable means secured thereto, such as a pair of traveling nuts mounted on a powered screw-threaded member secured in slides.

Figure 3:
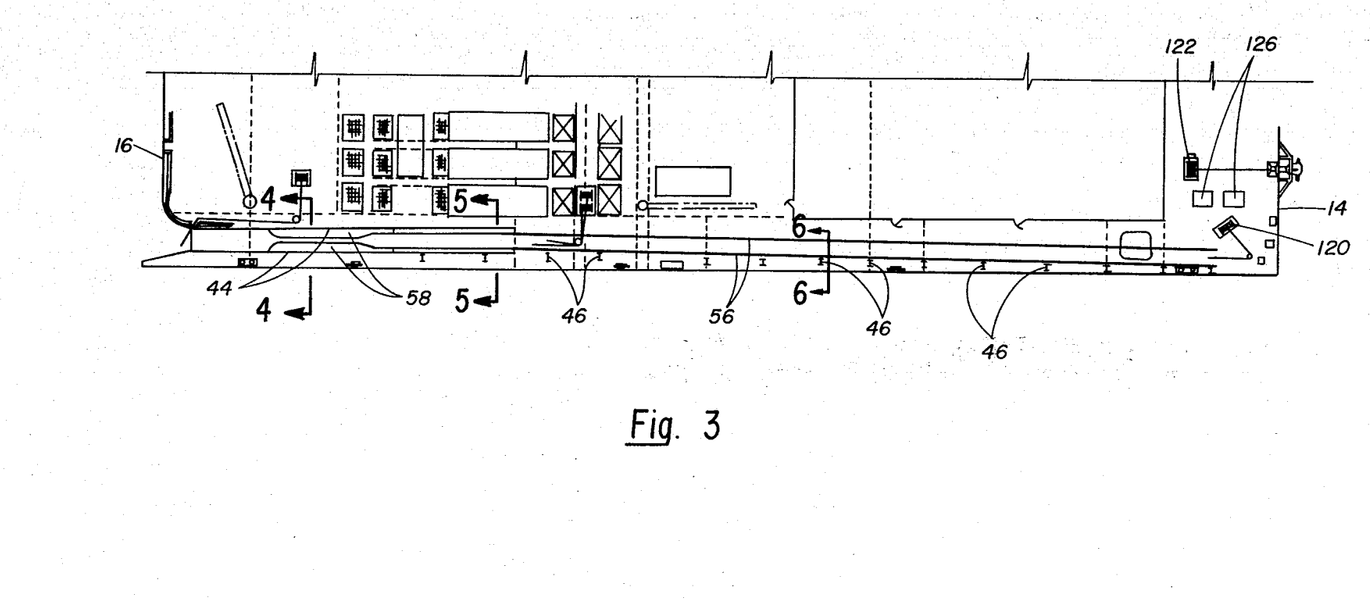
FIG. 3 is a partial plan view of the main deck of the open sea skimmer barge of the present invention.

Referring to FIG. 3, a partial planform view of the main deck of the open sea skimmer barge 10 is shown.

As shown, each aft ramp 44 supports a portion of a track 56 which extends throughout approximately the entire length of the barge 10 being supported by oil boom storage supports 46 where not secured to the aft ramp 44.

Figure 4:
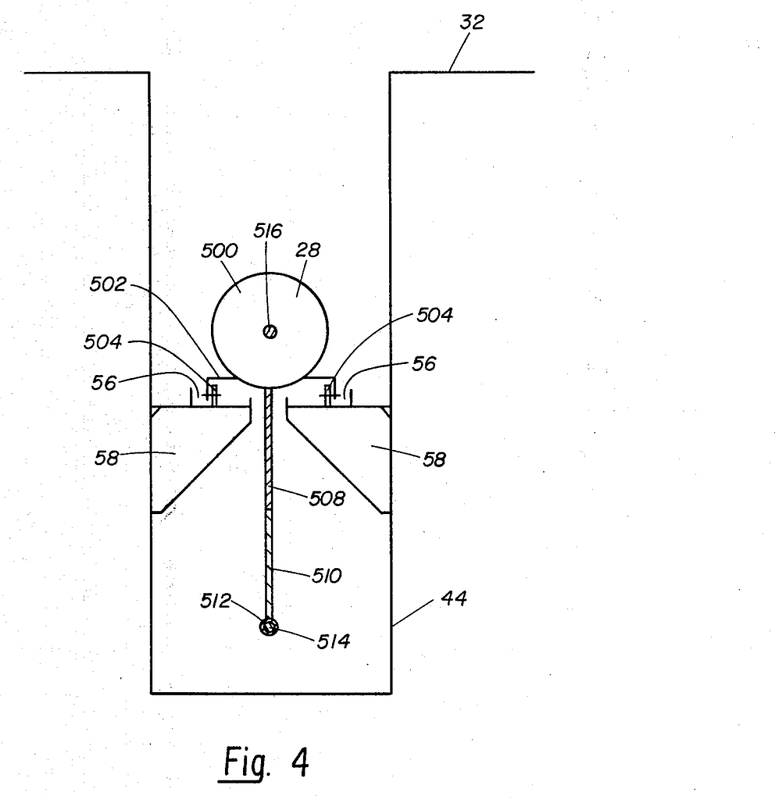
FIG. 4 is a cross-sectional view along line 4—4 of FIG. 3.

Referring to FIG. 4, the oil boom 28 is shown being supported by the track 56 which is, in turn, supported by brackets 58 secured to the side walls of an aft ramp 44. As shown, the bottom of the oil boom 28 is provided with sufficient clearance to permit the free movement of the boom 28 along each aft ramp 44 without interfering therewith.

Figure 5:
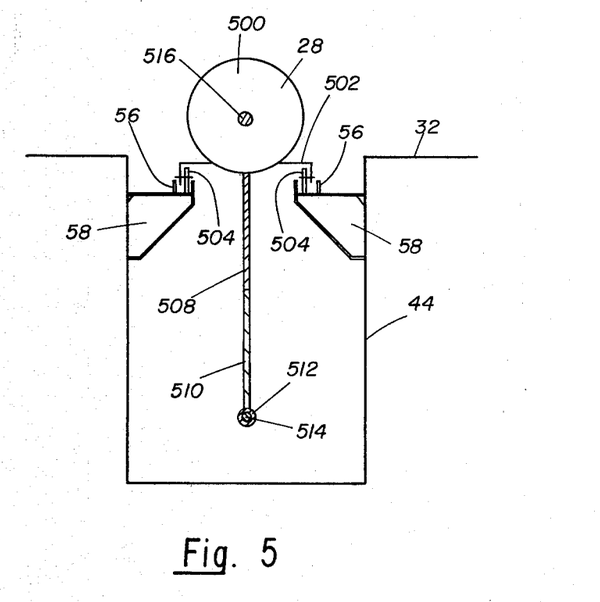
FIG. 5 is a cross-sectional view along line 5—5 of FIG. 3.

Referring to FIG. 5, the oil boom 28 is again shown being supported by the track 56 which is, in turn, supported by brackets 58 secured to the side walls of an aft ramp 44.

Figure 6:
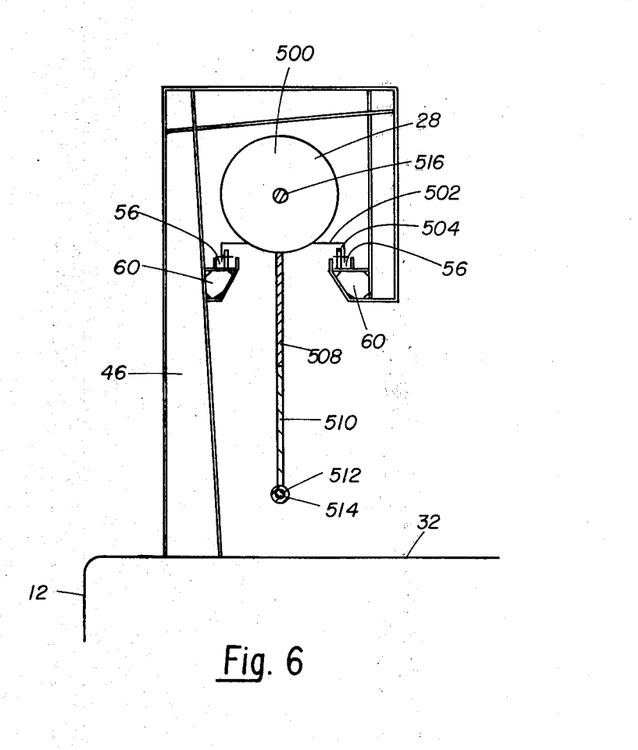
FIG. 6 is a cross-sectional view along line 6—6 of FIG. 3.

Referring to FIG. 6, the oil boom 28 is shown being supported by the track 56, which is, in turn, supported by brackets 60 secured to an oil boom storage support 46. As shown, the bottom of the oil boom 28 is provided with sufficient clearance to permit the free movement of the boom 28 along the main deck 32 without interfering therewith during deployment and retrieval operations.

Referring to FIGS. 1 through 6, it can be easily seen that each oil boom 28 comprises a plurality of boom floats 500 having transverse supports 502 secured thereto having, in turn, rotatable wheels 504 thereon which are received in the tracks 56, flexible members 506 interconnecting the boom floats 500, impermeable boom apron 508 secured to the bottom of boom floats 500 and flexible members 506 and permeable boom apron 510 secured to the bottom of impermeable boom apron 508 having a suitable line 514 retained within the bottom 512 of the permeable apron 510.

Running through the boom floats 500 is a line 516 suitable for use in towing operations of the open sea skimmer barge 10.

The first boom float 500' has an attachment means 518 secured thereto which is, in turn, secured to line 516, impermeable apron 508, permeable apron 510 and line 514. An attachment ring or other suitable means is included on end 520 of attachment means 518 for a line from a suitable towing means to be secured thereto.

The line 514 contained within the bottom 512 of the permeable apron 510 is utilized to weight the aprons 508 and 510 to maintain them in a submerged state and provide stability to the oil boom 28 during skimming operations.

Figure 7:
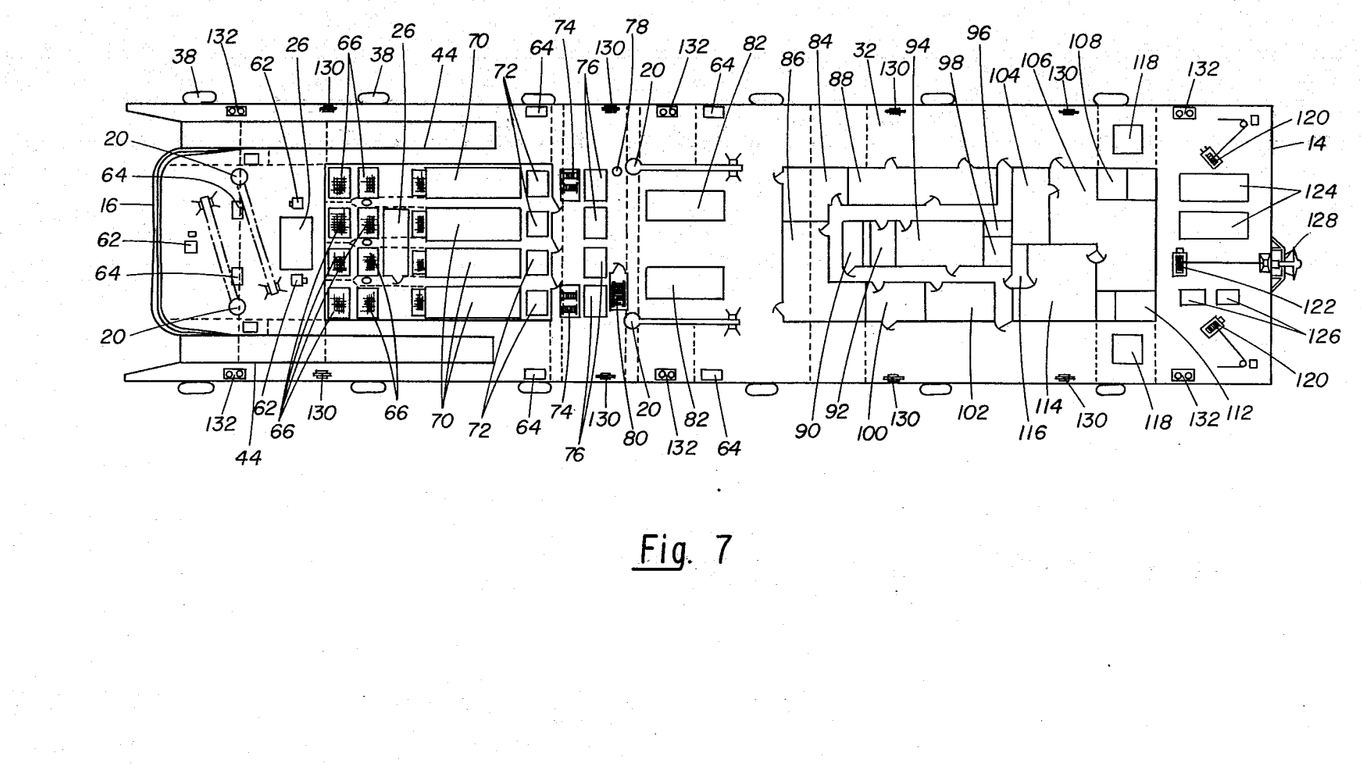
FIG. 7 is a plan view of the main deck of the open sea skimmer barge of the present invention.

Referring to FIG. 7, the main deck 32 is shown in planform. As shown the main deck 32 has a plurality of pedestal cranes 20 located thereon to assist in loading and unloading operations of the open sea skimmer barge 10. The winches 62 to assist in line handling operations and a plurality of washing units 64 for cleaning operations, particularly in the deployment and retrieval of the oil booms 28. The stern portion of the main deck 32 further includes the base portion of the skimmer control tower 26, which is utilized for deck observation, communication, skimmer control and storage purposes.

Forward of the stern portion of the main deck 32 are a plurality of observation hatches 66 which allow the observation of the spillage contained within the forward portion of the oil collection tank therebelow.

Located approximately amidship inboard of the cranes 20 thereat are teritary oil separation means 82 which may be of any suitable separation device, such as a gravity, electrostatic or centrifuge type separation device.

Located outboard of the tertiary oil separation means 82 are washing means 64 which assist in the cleaning of the oil booms 28 during retrieval and storing of the booms 28 on storage supports 46 (not shown.)

Forward of the cranes 20 and tertiary oil separators 82 is the main deck portion of the deck house 18. The main deck portion of the deck house 18 includes storage area 84, workshop 86, locker room 88, stairwell 90, storage room 92, laundry 94, pipe chase 96, equipment removal trunk 98, auxiliary generator 100, air handling equipment area 102, refrigerated storage 104, dry storage area 106, supply storage 108, galley 110, supply storage 112, mess 114 and stairwell 116 leading to below decks.

Located outboard of the main deck portion of the main deck 32 near the bow 14 of the open sea skimmer barge 10 are bow thruster hatches 118 which allow access to the retractable bow thrusters 40 located therebelow.

Located on the bow portion of the main deck 32 are oil boom winches 120, anchor winch 122, chemical dispensant storage tanks 124, jet fuel storage tanks 126 and anchor 128.

Located at various positions on the port and starboard sides of the main deck 32 are a plurality of padeyes 130, bitts 132 and cleats (not shown).

Forward of the observation hatches 66 is a deck storage compartment 68 for the storage of equipment or stores therein.

On the forward side of the storage compartment 68 are a plurality of filter belt hatches 70 which allow access to the secondary filter belt separation means 230 (not shown) located in the oil collection tank 144 therebelow.

Forward of the filter belt hatches 70 are a plurality of sump hatches 72 which allow access to the sump 150 for the secondary oil separation means 230 (not shown) located in the oil collection tank 144.

Forward of the sump hatches 70, located on the port and starboard side of the open sea skimmer barge 10, are auxiliary boom winches 74 which assist in the deployment and retrieval of the oil booms 28.

Slightly aft and outboard of the auxiliary boom winches 74 are washing units 64 which are utilized to clean the oil booms 28 when retrieving and storing the booms 28 on storage supports 46 (not shown).

Forward of the auxiliary boom winches 74 are a plurality of pump hatches 76 which allow access to the pumping means therebelow, while forward of the pump hatches 76 and aft of the cranes 20, located amidship of the open sea skimmer barge 10 on the port side of the barge 10, is an escape scuttle 78, and located on the starboard side is an enclosed stairway 80 leading to below decks.

BOOM DEPLOYMENT PROCEDURE

Figure 8:
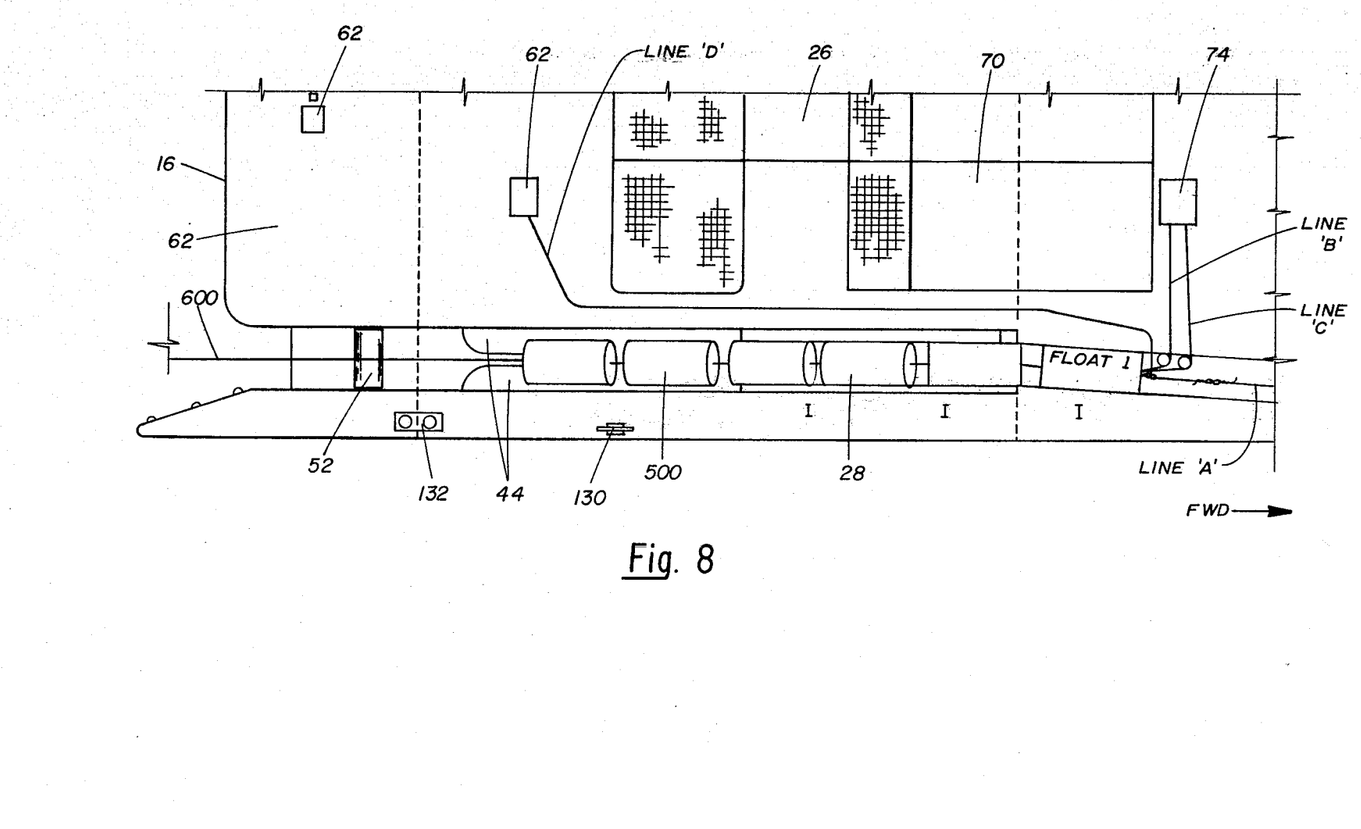
FIG. 8 is a partial plan view of the main deck of the open sea skimmer barge showing various lines for oil boom deployment of the present invention.

Referring to FIG. 8, a partial plan view of the deck 32 of the open sea skimmer barge 10 is shown.

To deploy the oil boom 28, a line 600 is attached to one end of the oil boom 28. A line "A" from a bow winch 120 (see FIG. 1) is secured to the other end of the oil boom 28 and is let out while the oil boom 28 floats out. When the last boom float 500 of oil boom 28 passes winch 74 on the main deck 32, the play out of line "A" is halted.

At this point, lines "B" and "C" from winch 74 are attached to the end of oil boom 28 and line "A" is detached therefrom and taken in on bow winch 120.

Figure 9:
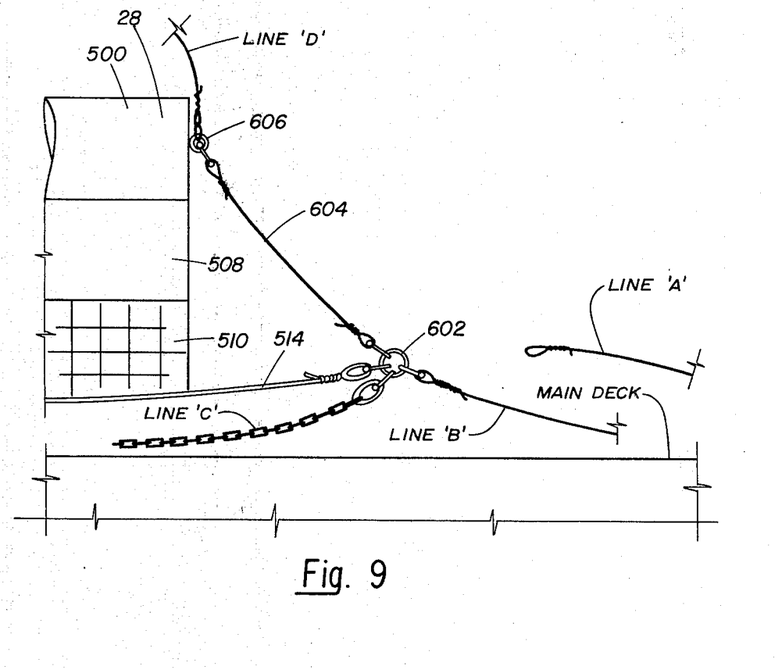
FIG. 9 is a side view of one end of the oil boom of the present invention.

Referring to FIG. 9, the deployment of the end of oil boom 28 is shown where lines "B" and "C" are attached thereto.

As shown, line "A" running to bow winch 120 has been disconnected from ring 602 while lines "B" and "C" have been connected thereto. Ring 602 also has connected thereto lines 604 and 516 respectively extending through the center and bottom of permeable apron 510 and the oil boom 28. Secured to the end of line 516 running through the boom floats 500 is ring 606 to which one end of line 604 is secured.

Also secured to ring 606 at this time is line "D" which runs to winch 62 located on the stern portion of the main deck 32.

It should be noted that line "C" is passed under adjustable roller 54 before securing the line "C" to ring 602 so that when the oil boom 28 is fully deployed, line "B" will pass over the top of the adjustable roller 54 while line "C" will pass under adjustable roller 54 thereby permitting the adjustable roller 54 to control the relationship between the end of oil boom 28 with respect to the stern 16 of the open sea skimmer barge 10. During the deployment of the oil boom 28 having lines "B" and "C" secured thereto as well as line "D" from the open sea skimmer barge 10, line "C" is taken in on winch 74 while line "B" is being played out.

Figure 10:
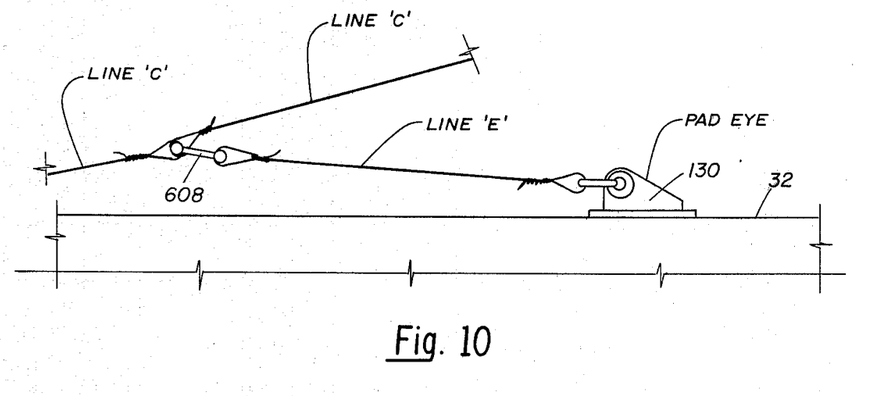
FIG. 10 is a side view of the partial line attachment for one end of the oil boom of the present invention.

Referring to FIG. 10, while the oil boom 28 is being launched and line "C" is being taken in, line "E" is secured having one end fastened to ring 608, which is at an intermediate position in line "C" at a location on the main deck 32, while the other end is fastened to a pad eye 130 on the main deck 32 of the open sea skimmer barge 10.

The line "E" is attached to a pad eye 130 on the main deck 32 and line "C" is let out from the winch 74 until tension from the boom floats 500 (not shown) is indicated on line "E".

Figure 11:
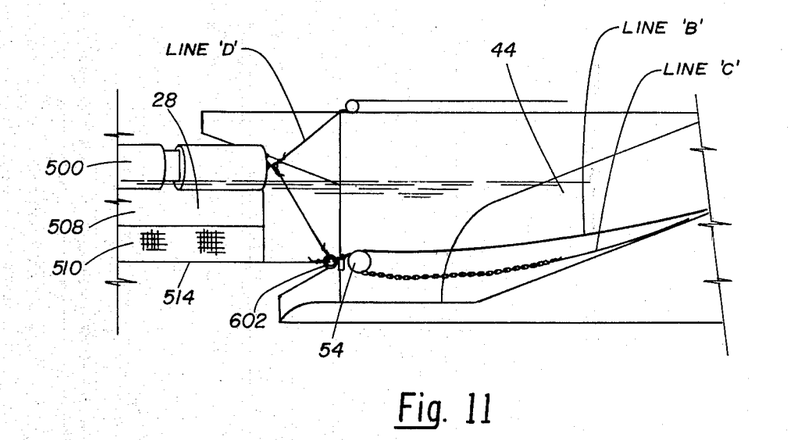
FIG. 11 is a cutaway side view of the deployed oil boom of the present invention and its attachment to the open sea skimmer barge.

Referring to FIG. 11, the relationship between the end of the oil boom 28 and the roller 54 is shown. When the boom floats 500 are fully extended in the sea, line "D" is taken in by winch 62 on the stern portion of the main deck 32 until the boom float 500 on one end of the oil boom 28 is lightly touching the outboard side of the aft ramp 44. At this time, the height of roller 54 may be adjusted to achieve the proper trim of the end of the oil boom 28 with respect to the open sea skimmer barge 10.

Figure 12:
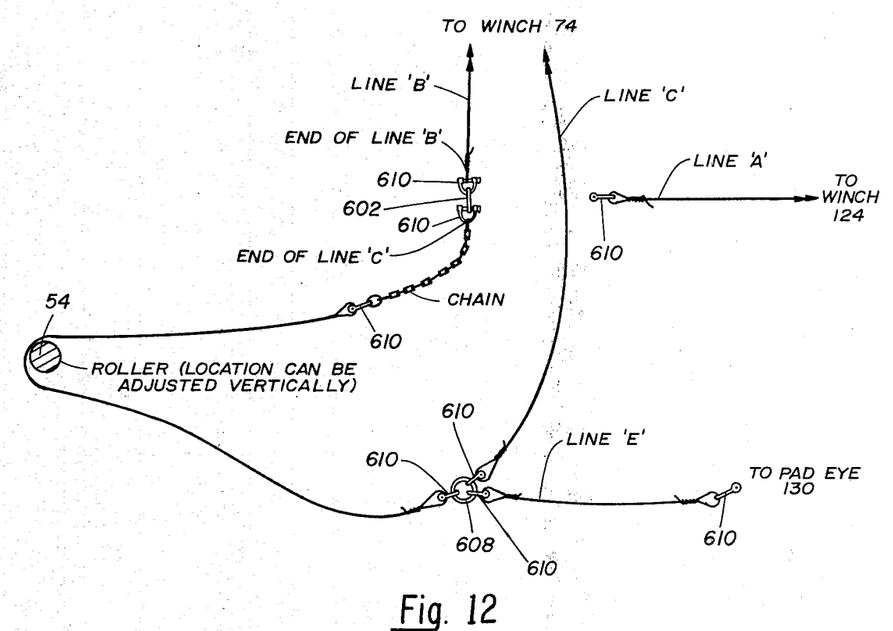
FIG. 12 is a schematic diagram of the line attachment for securing one end of the oil boom of the present invention to the open sea skimmer barge.

Referring to FIG. 12, the position and attachment of the various lines are shown. As can be easily seen to conveniently releasably attach the various lines to the rings 602 and 608, as well as at any other points, shackles 610 are utilized.

Figure 13:
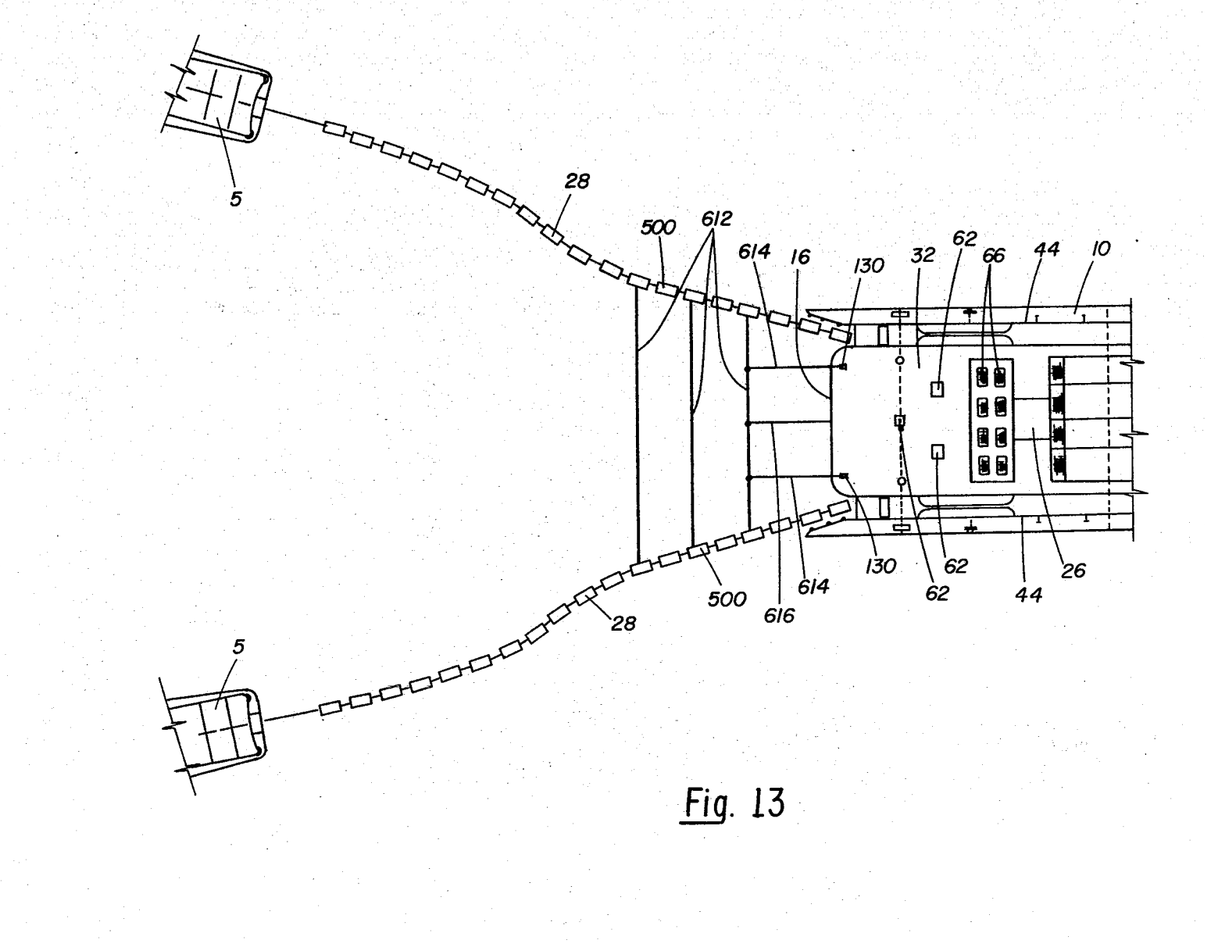
FIG. 13 is a top view of the deployed oil booms of the present invention and their relationship to the open sea skimmer barge.

Referring to FIG. 13, the oil booms 28 are shown in their deployed position. When deployed the oil booms 28 have vee lines 612 attached thereto in the portion of the oil booms 28 adjacent the stern 16 of the open sea skimmer barge 10.

The vee line 612 adjacent the stern 16 of the open sea skimmer barge 10 has tag lines 614 running to pad eyes 130 on the stern portion of the main deck 32, as well as line 616 running to winch 62 located on the centerline of the barge 10 on the stern portion of the main deck 32.

As described previously, shackles are utilized at all connections of the various vee lines 612, tag lines 614 and winch line 616 to the oil booms 28 or each other for the ready attachment or release thereof.

Also shown are suitable towing vessels 5, such as tug boats, each having one end of the oil boom 28 secured thereto.

It should be understood that the various vee lines 612, tag lines 614 and winch line 616 are secured to the boom floats 500 at suitable positions and to each other when the oil booms 28 are being deployed and as the various winch lines "A", "B", "C" and "D" and line "E" are being attached to the oil booms 28.

Referring in general to FIGS. 8 through 13, the recovery of the oil booms 28 will be described.

Initially to recover the oil booms 28, tension is taken up on line "C" by actuating winch 74 and line "E" is detached from the pad eye 130 on the main deck 32. Subsequent to the detachment of line "E", line "B" is taken up on winch 74 while line "C" is played out from winch 74 and line "B" is played out by winch 62 on the stern portion of the main deck 32.

When the boom float 500 on one end of the oil boom 28 is adjacent the winch 74, line "D" is detached from ring 606 which is attached to boom float 500 and line "D" is taken up on winch 62. At this time, line "A" is let out by winch 120 and attached to ring 602 and lins "B" and "C" are removed therefrom. Tension is taken in on line "A" by winch 120 to draw the oil booms 28 along track 56 which runs along aft ramps 44 and boom supports 46. For storage, lines "B" and "C" are connected together with shackles and slack is taken up on line "C" by winch 74.

The winch 120 takes in line "A" until the boom float 500 on the end of oil boom 28 is located at the boom support 46 adjacent the winch 120 and the line running to the towing means 5 is detached from the other end of the oil boom 28. In this position the oil booms 28 are stored on boom supports 46 along either the port or starboard side of the open sea skimmer barge 10.

During the recovery of the oil booms 28, the vee lines 612, tag lines 614 and winch line 616 must also be recovered. To recover these lines the cranes 20 on the stern portion of the main deck 32 are utilized.

As the oil booms 28 are recovered and the vee lines 612 are within the reach of the cranes 20, the cranes 20 are extended over the stern 16 of the open sea skimmer barge 10 having grappling hooks on the lines running therefrom to lift the vee lines 612 from the sea. When on the main deck 32, the tag lines 614 and winch line 616 are disconnected from the initial vee line 612 and stored. With each subsequent vee line 612, the procedure is repeated with the lines being stored after removal from the oil booms 28.

It should be understood that during the recovery of the oil booms 28, the cleaners 64 on the main deck 32 are utilized to clean the oil booms 28 and the various lines.

Those skilled in the art may recognize additions, deletions, substitutions and modifications which may be made with respect to the oil booms, their method of deployment and retrieval and the open sea skimmer barge but which lie within the purview of the invention as defined by the appended claims.

Having thus described our invention, we claim:

1. An apparatus for collecting and containing oil and the like on the surface of the water, said apparatus comprising:
   a plurality of float means adapted to float on said surface of the water;
   float line means interconnecting said plurality of float means;
   support means secured to each float means of said plurality of float means;
   wheel means located on said support means;
   impermeable apron means having one edge thereof secured to said plurality of float means;
   permeable apron means having one edge thereof secured to another edge of said impermeable apron; and
   apron line means secured to another edge of said permeable apron.

2. The apparatus of claim 1 further comprising:
   flexible member means interconnecting said plurality of boom floats.

3. The apparatus of claim 1 wherein said support means secured to each float means of said plurality of float means extends transversely from each float means.

4. The apparatus of claim 3 wherein said wheel means are located on the ends of said support means.

5. The apparatus of claim 1 wherein said impermeable apron means is secured to said plurality of float means having the upper edge thereof secured to the bottom of said plurality of float means.

6. The apparatus of claim 5 wherein said permeable apron means is secured to said impermeable apron means having the upper edge thereof secured to the bottom edge of said impermeable apron means.

7. The apparatus of claim 6 wherein apron line means is secured to the bottom edge of said permeable apron.

8. The apparatus of claim 1 wherein a plurality of transverse support means are secured to each float means of said plurality of float means.

9. The apparatus of claim 1 wherein said float line means extends through each float means of said plurality of float means.

10. An apparatus for collecting and containing oil and the like on the surface of the water, said apparatus comprising:
    a plurality of float means adapted to float on said surface of the water;
    float line means interconnecting said plurality of float means;
    transverse support means secured to each float means of said plurality of float means;
    wheel means located on said support means;
    flexible member means interconnecting said plurality of boom floats;
    impermeable apron means having the upper edge thereof secured to said plurality of float means;
    permeable apron means having the upper edge thereof secured to the bottom edge of said impermeable apron means; and
    apron line means secured to the bottom edge of said permeable apron.

11. The apparatus of claim 10 wherein said float line means and said apron line means have one end thereof secured together.

12. In combination, apparatus for collecting, containing and directing oil and the like on the surface of the water and an open sea skimmer barge having track means on the sides of the hull thereof extending from the deck to adjacent said surface of the water, said apparatus comprising:
    a pair of oil booms having one oil boom being releasably secured to one side of said open sea skimmer barge and the other oil boom releasably secured to the other side of said open sea skimmer barge to collect, contain and direct said oil and the like on said surface of the water to said open sea skimmer barge, each oil boom of said pair including:
    a plurality of float means adapted to float on said surface of the water;
    float line means interconnecting the plurality of float means having one end thereof releasably secured to said open sea skimmer barge;
    support means secured to each float means of the plurality of float means;
    wheel means located on the support means adapted to be received in the track means to facilitate the transport of the oil boom from said surface of the water to the deck of said open sea skimmer barge;
    flexible member means interconnecting the plurality of boom floats one to the other;
    impermeable apron means secured to the plurality of float means;
    permeable apron means secured to the bottom of the impermeable apron means; and
    apron line means secured to the bottom of the permeable apron having one end thereof releasably secured to said open sea skimmer barge and the other end thereof secured to the other end of the float line means.

13. The combination of claim 12 wherein said apparatus further comprises:
    vee line means releasably securing one oil boom to the other oil boom of the pair of oil booms when the pair of oil booms are floating on said surface of the water.

14. The combination of claim 12 wherein the support means secured to each float means of the plurality of float means comprise transverse support means.

15. In combination, an open sea skimmer barge and apparatus for collecting, containing, and directing oil and the like on the surface of the water, wherein said open sea skimmer barge comprises:
    a hull having a bow, a bottom, side walls, a stern having a substantially horizontal elongate slot extending across a portion thereof, and a deck;
    aft ramp means located on each side of the hull extending downwardly from the deck and terminating at the stern at a position adjacent the bottom of the hull;
    oil boom storage means located along a portion of the deck of the hull at a position forward of the aft ramp means located on each side of the hull;

track ramp means extending along a portion of each aft ramp means; and track means secured to the track ramp means and the oil boom storage means; and wherein said apparatus comprises:

a pair of oil booms having one oil boom being releasably secured to the port side of said open sea skimmer barge and the other oil boom releasably secured to the starboard side of said open sea skimmer barge to collect, contain and direct said oil and the like on said surface of the water to said open sea skimmer barge, each oil boom of said pairs including:

a plurality of float means adapted to float on said surface of the water;

float line means interconnecting the plurality of float means having one end thereof releasably secured to said open sea skimmer barge;

support means secured to each float means of the plurality of float means;

wheel means located on the support means adapted to be received in the track means to facilitate the transport of the oil boom from said surface of the water to the deck of said open sea skimmer barge;

flexible member means interconnecting the plurality of boom floats one to the other;

impermeable apron means secured to the plurality of float means;

permeable apron means secured to the bottom of the impermeable apron means; and apron line means secured to the bottom of the permeable apron having one end thereof releasably secured to said open sea skimmer barge and the other end thereof secured to the other end of the float line means.

16. The combination of claim 15 wherein said apparatus further comprises:

vee line means releasably securing one oil boom to the other oil boom of the pair of oil booms when the pair of oil booms are floating on said surface of the water.

17. The combination of claim 15 wherein the support means secured to each float means of the plurality of float means comprise transverse support means.

* * * * *